Patented June 25, 1929.

1,718,917

UNITED STATES PATENT OFFICE.

COLIN R. BOWERS, OF LOS ANGELES, CALIFORNIA, ASSIGNOR OF ONE-FOURTH TO JAMES H. ANDERSON, OF STOCKTON, CALIFORNIA.

TEMPERING, WELDING, AND BRAZING COMPOUND.

No Drawing. Application filed January 3, 1929. Serial No. 330,143.

This invention relates to a composition of matter in the nature of a flux or welding, brazing and tempering compound.

The invention also provides a compound or flux which is capable of effective use upon oily or greasy metallic surfaces without the necessity of cleaning them.

With the foregoing objects in view, my invention comprises a compound or flux formed of the following ingredients:

1 pound of borax.
1 ounce of sal-ammoniac.
1 ounce of Venetian red.
1 ounce of bicarbonate of soda.
1 ounce of salt.
¼ ounce of powdered coke.

The above ingredients are first pulverized in any suitable manner, then thoroughly mixed together in a vessel, or other suitable receptacle, so that the several parts will be well blended.

It is a welding flux because the function of the borax and the sal-ammoniac is to dissolve the oxides and slag them off the surface to protect them from the atmosphere. Salt gives it an effect in welding brass and bronze; bicarbonate of soda aids in fluxing off its scale protecting the surface. Coke is a reducing agent to prevent the oxidation of metals. All materials welded with my flux can be machined.

I have found that the exact combination of ingredients hereinafter claimed to be particularly efficient, not only in aiding the welding and brazing but in the proper preparation (cleaning and deoxidizing) of the surfaces to be welded and brazed. My compound has been found from practical experience to work readily with all metal and its action is not selective as is often the case. It is not necessary to clean or grind materials before being welded.

I am aware that patents have been issued disclosing in general certain of the ingredients which I hereinafter specifically claim, but the prior art does not show what I have discovered to be of great value, to wit: the exact single compound including collectively only the specific ingredients and exact proportions claimed.

Therefore, what I claim to be new in a single compound is:

As a new article of manufacture, a compound of the class described, comprising one pound of borax, one ounce of sal-ammoniac, one ounce of Venetian red, one ounce of bicarbonate of soda, one quarter ounce of powdered coke and one ounce of salt, compounded as and for the purpose hereinbefore specifically described.

In testimony whereof I hereunto affix my signature.

COLIN R. BOWERS.